United States Patent
Li et al.

(10) Patent No.: US 10,684,723 B2
(45) Date of Patent: Jun. 16, 2020

(54) TOUCH DEVICE AND CONTROL METHOD THEREOF

(71) Applicant: Getac Technology Corporation, Hsinchu County (TW)

(72) Inventors: Chui-Hsien Li, Taipei (TW); Chin-Jung Chang, Taipei (TW); Yao-Wei Yang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 16/167,836

(22) Filed: Oct. 23, 2018

(65) Prior Publication Data
US 2020/0125208 A1    Apr. 23, 2020

(51) Int. Cl.
*G06F 3/0354* (2013.01)
*G06F 3/044* (2006.01)
*G06F 3/041* (2006.01)
*G06F 1/16* (2006.01)

(52) U.S. Cl.
CPC ............ *G06F 3/0416* (2013.01); *G06F 1/169* (2013.01); *G06F 1/1643* (2013.01); *G06F 3/03545* (2013.01); *G06F 3/0412* (2013.01)

(58) Field of Classification Search
CPC ... G06G 3/03545; G06F 3/044; G06F 3/0416; G06F 1/14643; G06F 1/169; G06F 3/412
See application file for complete search history.

(56) References Cited

U.S. PATENT DOCUMENTS

| | | | |
|---|---|---|---|
| 9,013,429 B1 * | 4/2015 | Krekhovetskyy | G06F 3/03545 345/173 |
| 9,552,049 B1 * | 1/2017 | Butler | G06F 1/3259 |
| 9,766,724 B2 * | 9/2017 | Feng | G06F 3/03545 |
| 2017/0075852 A1 * | 3/2017 | Mishra | G06F 13/4282 |
| 2017/0123474 A1 * | 5/2017 | Tang | G06F 1/325 |

* cited by examiner

*Primary Examiner* — Lixi C Simpson
(74) *Attorney, Agent, or Firm* — Locke Lord LLP; Tim Tingkang Xia, Esq.

(57) ABSTRACT

A touch device includes a touch sensing unit, a processing unit, an embedded controller and a digital controller. The touch sensing unit has a first control mode and a second control mode, and senses a touch event from a touch stylus. The embedded controller is coupled to the processing unit. The digital controller is coupled to the touch sensing unit, the embedded controller and the processing unit, and receives a general-purpose input/output (GPIO) signal from the embedded controller. When the GPIO signal is in a first value, the digital controller reports the first control mode to the processing unit. When the GPIO signal is in a second value, the digital processor reports the second control mode to the processing unit. Thus, the performance of the touch device and the touch stylus is improved.

8 Claims, 6 Drawing Sheets

TOUCH DEVICE AND CONTROL METHOD THEREOF

BACKGROUND OF THE INVENTION

Field of the Invention

The present invention relates to a touch device and a control method thereof, and more particularly to a touch device using a touch stylus and a control method thereof.

Description of the Prior Art

A common touch device 20 can be categorized into a resistive, capacitive, optical, electromagnetic or an acoustic touch device. Among the above, the electromagnetic technology is mainly applied to digitizer products. A principle of the electromagnetic technology is that, with the operation of an electromagnetic stylus, an intended action of the electromagnetic stylus is determined according to changes in the magnetic field of sensing lines below a panel. The electromagnetic technology has a high resolution and a fast response speed, and is applicable to screen panels for directly writing thereon. Further, the control function of an electromagnetic stylus is richer than those of other touch control technologies; for example, other technologies are capable of detecting only a press event (or simulating a left click on a mouse) but is incapable of detecting an approach. Moreover, a "button" serving as a function key (for simulating a right click of a mouse or a function menu) may be additionally provided on a pen body of an electromagnetic stylus, so as to provide additional functions of detecting events such as "a pressing stylus" or "an inclination angle of the touch stylus" (capable of simulating the thickness of a stroke), and "near-field" sensing (capable of simulating a cursor movement of a mouse) for displaying a prompt message when a cursor remains on a function menu as in a normal computer.

Apart from being operated by a finger, a touch device often receives an input by using a touch stylus. An electromagnetic touch device achieves left-button functions such as writing, drawing or clicking and a cursor control function of a mouse by receiving a touch frequency of a penpoint of an electromagnetic touch stylus. If a touch stylus needs to perform other functions such as an eraser or a right-button of a mouse, an electromagnetic touch stylus needs to send another touch frequency to cause the electromagnetic touch device to achieve such function of an eraser or a right-button according to another touch frequency.

However, if a touch stylus is to send another frequency, corresponding additional hardware is required on the touch stylus, e.g., an additional coil provided on the other end (e.g., the pen tail) of the touch stylus. As a result, not only production costs of the touch stylus and hence retail prices are increased, but also the weight and volume of the touch stylus are increased, which do not meet user expectations for small, light and slim electronic products.

SUMMARY OF THE INVENTION

In view of the above, the present invention provides a touch device and a control method thereof capable of further enhancing the function diversity of touch control without modifying hardware of a touch stylus.

In one embodiment, a touch device includes a touch sensing unit, a processing unit, an embedded controller and a digital controller. The touch sensing unit has a first control mode and a second control mode, and senses a touch event from a touch stylus. The embedded controller is coupled to the processor. The digital controller is coupled to the touch sensing unit, the embedded controller and the processing unit, and receives a general-purpose input/output (GPIO) signal from the embedded controller. When the GPIO signal is in a first value, the digital controller reports the first control mode to the processing unit. When the GPIO signal is in a second value, the digital controller reports the second control mode to the processing unit.

In one embodiment, a control method for a touch device includes outputting a general-purpose input/output (GPIO) signal, reporting that a touch sensing unit is in a first control mode to a processing unit when the GPIO signal is in a first value, and reporting that the touch sensing unit is in a second control mode to the processing unit when the GPIO signal is in a second value.

In conclusion, in the touch device and the control method thereof according to an embodiment of the present invention, the function diversity of a touch stylus is enhanced by setting a touch signal to correspond to different control modes without requiring a design of additional coils on the touch stylus. In the touch device and the control method thereof according to an embodiment of the present invention, a user can switch a control mode as required such that the same touch signal can perform different operation functions in the touch device. In the touch device and the control method thereof according to an embodiment of the present invention, whether the touch device is in the first control mode or the second control mode, cursor and left-button functions of the touch stylus are maintained to further enhance optimum user experience. The touch device and the control method thereof according to an embodiment of the present invention are applicable in coordination with a touch stylus, and can perform multiple touch functions with the coordination with a single touch end of the touch stylus in any control mode.

DETAILED DESCRIPTION OF THE EMBODIMENTS

Figure 1:
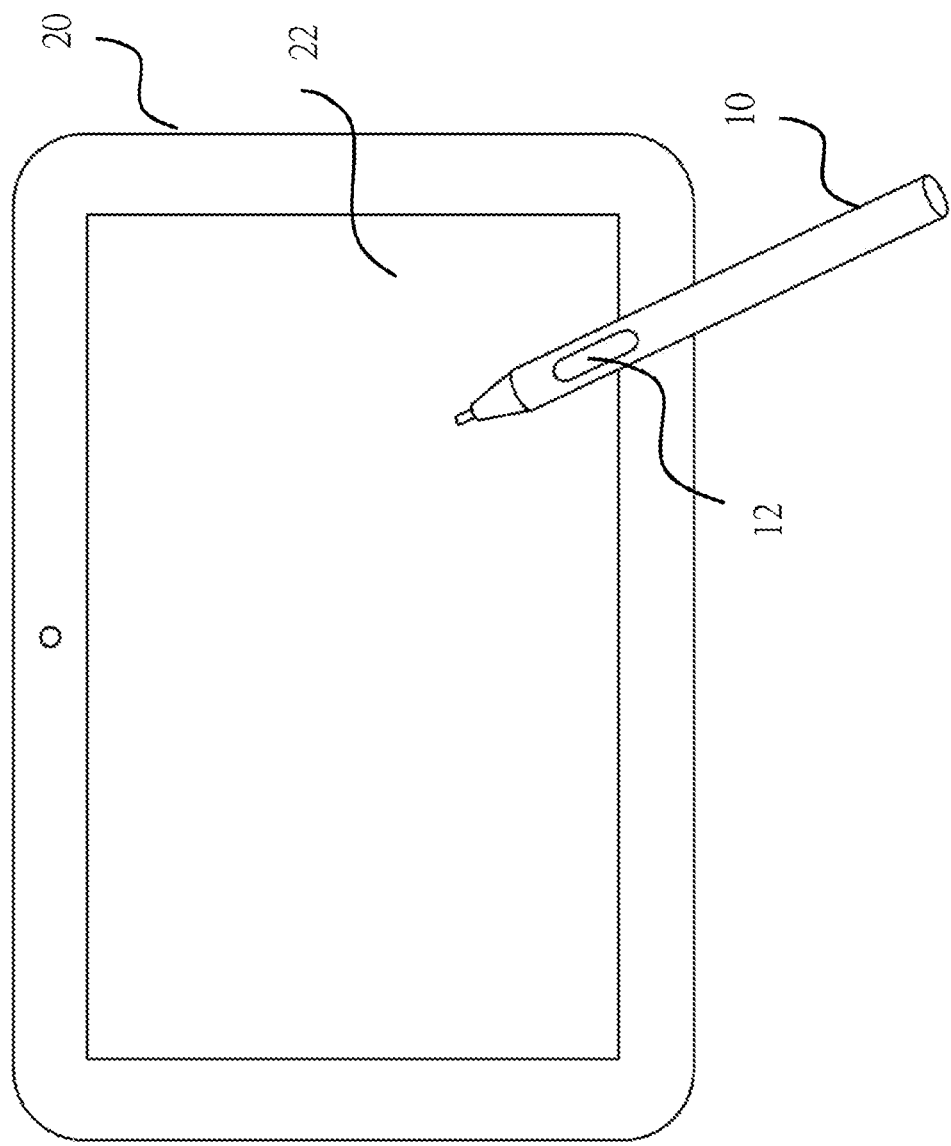
FIG. 1 is a schematic diagram of a touch device and a touch stylus in use according to an embodiment of the present invention.
Figure 2:
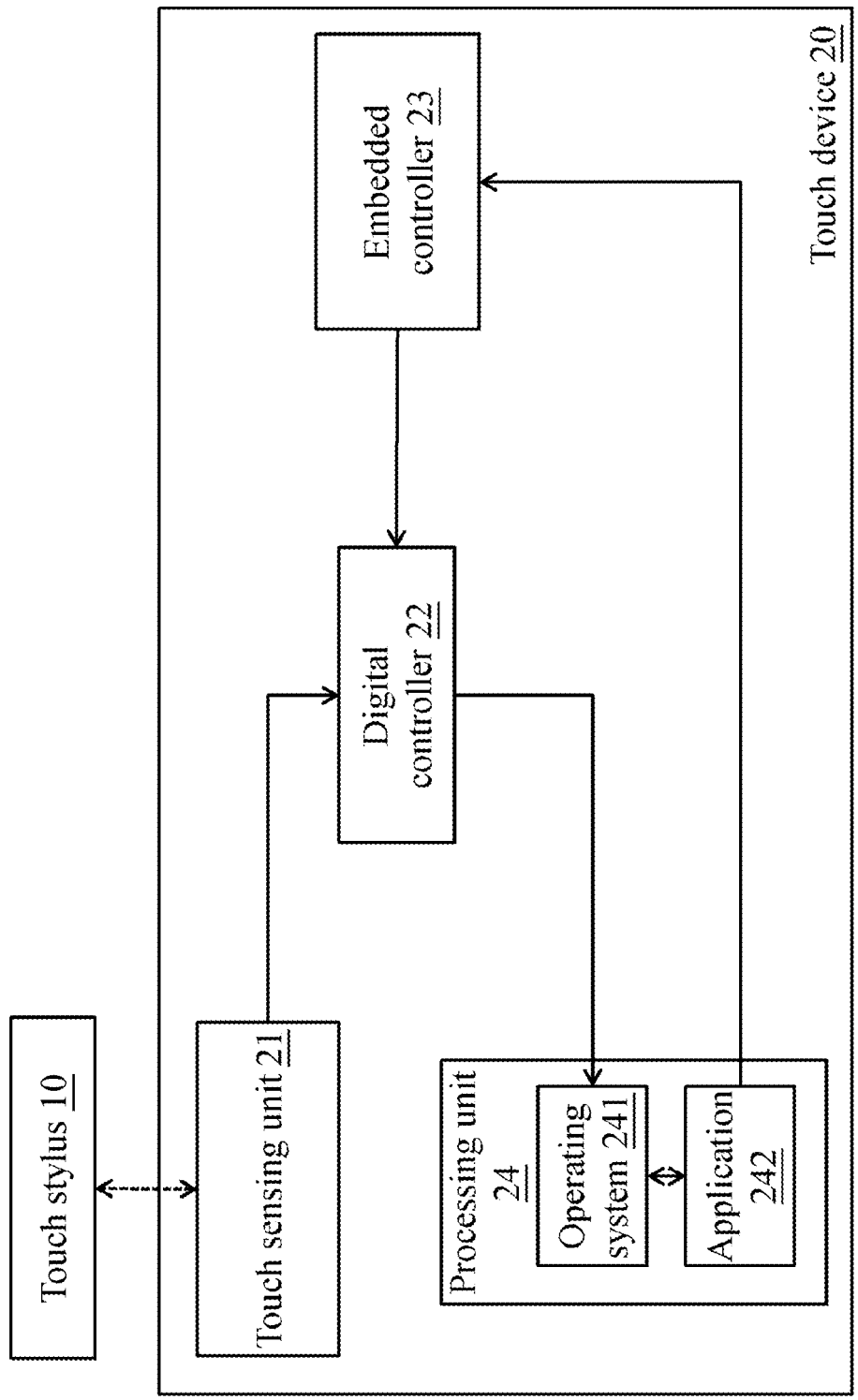
FIG. 2 is a system block diagram of a touch device according to an embodiment of the present invention.

FIG. 1 shows a schematic diagram of a touch device and a touch stylus in use according to an embodiment of the present invention. FIG. 2 shows a system block diagram of a touch device according to an embodiment of the present invention. Referring to FIG. 1 and FIG. 2, a touch device 20 includes a touch sensing unit 21, a digital controller 22, an embedded controller 23 and a processing unit 24. The digital controller 22 is coupled to the touch sensing unit 21, the processing unit 24 and the embedded controller 23. The touch sensing unit 21 is for detecting a touch event from a touch stylus 10. The digital controller 22 receives a general-purpose input/output (GPIO) signal from the embedded controller 23 and a touch signal from the touch sensing unit 21.

In some embodiments, the touch device 20 adopts an electromagnetic type, and the touch stylus 10 correspondingly adopts an electromagnetic type. In the embodiment, the touch device 20 is an electromagnetic device, and the touch stylus 10 is an electromagnetic touch stylus, wherein a frequency detected by the touch sensing unit 21 of the touch device 20 can be changed by pressing a button 12 provided on a pen body of the touch stylus 10.

Again referring to FIG. 1 and FIG. 2, the touch sensing unit 21 has a first control mode and a second control mode. When the GPIO signal received by the digital controller 22 is in a first value, the digital controller 22 reports the first control mode to the processing unit 24. When the GPIO signal received by the digital controller 22 is in a second value, the digital controller 22 reports the second control mode to the processing unit 24. At this point, the processing unit 24 processes a touch signal received according to one of the first control mode and the second control mode.

In some embodiments, the processing unit 24 or the embedded controller 23 may be implemented by one or more processing elements, which are, for example but not limited to, a system-on chip (SoC), a central processing unit (CPU) or a microcontroller (MCU). In some embodiments, the GPIO signal is an analog signal. For example, the first value of the GPIO signals is a low potential or a high potential, and the second value of the GPIO signal is a high potential or a low potential. In some embodiments, the GPIO signal is a digital signal. For example, the digital controller 22 receives the digital GPIO signal sent by the embedded controller 23. When the value of the GPIO signal is logic 0, the digital controller 22 reports the first control mode to the processing unit 24, and the processing unit 24 operates in response to a subsequently received touch signal according to the first control mode. When the value of the GPIO signal is logic 1, the digital controller 22 reports the second control mode to the processing unit 24, and the processing unit 24 operates in response to a subsequently received touch signal according to the second mode.

In some embodiments, the embedded controller 23 can receive a switch signal sent from the processing unit 24, and generate the GPIO signal according to the switch signal. In some embodiments, the processing unit 24 includes therein an application (APP) 242. The application 242 sends the switch signal, and the embedded controller 23 determines whether the GPIO is in the first or second value according to the switch signal. In some embodiments, the touch sensing unit 21 detects a touch event from the touch stylus 10, and the application 242 receives a signal of a switch event to send the switch signal. For example, a switch event is triggered when the touch stylus 10 consecutively touches the touch sensing unit 21 three times, and the signal of the switch event is transmitted through the digital controller 22 to an operating system 241 and is then converted to the switch signal by the application 242, thus changing the GPIO signal from the first value to the second value. For another example, the switch event is triggered when the touch stylus 10 touches a predetermined position on the touch sensing unit 21, thus changing the GPIO signal from the first value to the second value. For yet another example, in a situation where the touch stylus 10 touches the touch sensing unit 21, the switch event is triggered by consecutively pressing the button 12 three times.

Again referring to FIG. 1 and FIG. 2, the processing unit 24 includes the operating system (OS) 241. In some embodiments, the operating system 241 receives a signal sent from the digital controller 22. In some embodiments, the digital controller 22 transmits a signal to the operating system 241 through a USB channel.

In some embodiments, a touch event is considered as taking place when the touch stylus 10 comes into contact with the touch sensing unit 21. That is to say, when the touch sensing unit 21 sense a touch event from the touch stylus 10, the touch sensing unit 21 generates a touch signal representing the touch event. At this point, the touch signal may include at least one of position information, click information, information of the number of touch and path information.

In some embodiments, the digital controller 22 further receives a touch signal from the touch sensing unit 21, and outputs position information corresponding to the touch signal to the processing unit 24. In some embodiments, when the GPIO signal is in the second value, the processing unit 24 performs a touch operation of the second control mode according to the position information; when the GPIO signal is in the first value, the processing unit 24 performs the touch operation of the first control mode according to the position information.

In some embodiments, the first control mode is a left-button function for performing a cursor and left-button function, and the second control mode is an erase function or one of other numerous touch functions. For example, in the first control mode, the operating system 241 of the processing unit 24 regards the touch signal as a stroke instruction, and the processing unit 24 performs the display of a stroke path according to the position information. In the second control mode, the operating system 241 regards the touch signal as an erase instruction, and the processing unit 24 performs the erase function according to the position information, i.e., clearing displayed contents at the position represented by the position information.

In some embodiments, the first control mode is a left-button function for performing cursor and left-button functions, and the second control mode is a right-button function for performing one of other numerous touch functions. That is to say, in the first control mode, the operating system 241 regards the touch signal as a left-button instruction; in the second control mode, the operating system 241 regards the touch signal as a right-button instruction. For example, in the first control mode, the operating system 241 executes an application touch selected by the touch stylus 10; in the second control mode, the operating system 241 opens a configuration window of an application touch selected by the touch stylus 10.

It is known from above that, when the touch stylus 10 provides a touch event of one single contact end (e.g., lightly touching the touch sensing unit 21 once by the touch stylus 10), the touch device 20 is capable of determining whether the user issued instruction is a left-button instruction or a right-button instruction according to the touch event and the GPIO signal. That is to say, even if the touch stylus 10 provides a touch event of only one frequency, two different instructions can be accordingly issued to perform multiple touch functions.

In some embodiments, the digital controller 22 further outputs the position information corresponding to the touch signal to the processing unit 24, and the frequency of the touch signal is one of a first frequency and a second frequency. At this point, the frequency of the touch signal refers to a frequency received due to electromagnetic sensing between the touch stylus 10 and the touch sensing unit 21. For example, a frequency received if the touch stylus 10 directly comes into contact with the touch sensing unit 21 is the first frequency, and a frequency received if the touch stylus 10 comes into contact with the touch sensing unit 21 when the button 12 is pressed is the second frequency.

In some embodiments, when the frequency of the touch signal is the first frequency, the processing unit 24 performs a touch operation of the first control mode according to the position information. When the frequency of the touch signal is the second frequency and the GPIO signal is in the first value, the processing unit 24 performs a touch operation of the first control mode according to the position information. When the frequency of the touch signal is the second frequency and the GPIO signal is in the second value, the processing unit 24 performs a touch operation of the second control mode according to the position information. Table-1 below lists the GPIO signal, the frequency of the touch signal, the type of the control mode, and the corresponding functions, so as to provide a clearer expression.

TABLE 1

| GPIO signal | Frequency of touch signal | Type of control mode | Corresponding function |
|---|---|---|---|
| First value | First frequency | First control mode | First function |
| First value | Second frequency | First control mode | Second function |
| Second value | First frequency | Second control mode | First function |
| Second value | Second frequency | Second control mode | Fourth function |

It is known from Table-1 that, in a situation where the touch signal has two frequencies, the touch stylus 10 kept at the first frequency corresponds to the first function. For example, the first function is a left-button function, the second function is a right-button function, and the fourth function is an erase function. In other words, whether in the first control mode or the second control mode, the basic cursor and left-button functions of the touch stylus 10 are maintained. In this embodiment, if the digital controller 22 originally does not receive the GPIO signal of the embedded controller 22 and the button 12 is pressed to switch the frequency detected by the touch sensing unit 21 of the touch device 20 between the first frequency and the second frequency, the button 12 can serve for switching between a left-button function or a right-button function for the touch stylus 10. However, in addition to the first frequency or the second frequency detected by the touch sensing unit 21, if the digital controller 22 further receives the GPIO signal switching between the first value and the second value from the embedded controller 23, the corresponding function of the button 12 can be expanded. As such, when the button 12 is not pressed and the first frequency is detected, whether the GPIO signal is in the first value or the second value, a left-button function is corresponded; when the button 12 is pressed and the second frequency is detected, a right function or an erase function is corresponded according to whether the GPIO signal is in the first value or the second value. The type of the control mode is for reflecting the GPIO signal, the first control mode corresponds to the first value and the second control mode corresponds to the second value.

In some other embodiments, in the first control mode or the second control mode, the first frequency and the second frequency respectively perform different functions. For example, Table-2 below lists the GPIO signal, the frequency of the touch signal, the type of the control mode, and the corresponding functions, so as to provide a clearer expression.

TABLE 2

| GPIO signal | Frequency of touch signal | Type of control mode | Corresponding function |
|---|---|---|---|
| First value | First frequency | First control mode | First function |
| First value | Second frequency | First control mode | Second function |
| Second value | First frequency | Second control mode | Third function |
| Second value | Second frequency | Second control mode | Fourth function |

It is known from Table-2 that, in a situation where the touch signal has two frequencies, the touch stylus 10 corresponding to the touch device 20 can generate four different functions. For example, the first function is a left-button function, the second function is a right-button function, the third function is a roller-function, and the fourth function is an erase function. In other words, if the touch signal has three frequencies, the touch stylus 10 corresponding to the touch device 20 can generate six different functions.

In normal situations, the penpoint of a touch stylus has a writing function, a tail of the touch stylus is provided with an additional coil to generate another frequency for performing an erase function, and a button on a pen body of the touch stylus is for performing a right-button function. Referring to FIG. 1, in the above embodiment, no additional coil needs to be provided at the tail of the touch stylus 10, and a right-button function and an erase function can be simultaneously achieved through the button 12 given that the button 12 is provided on the pen body, thereby reducing the number of hardware components on the touch stylus 10 while achieving the same effect.

Figure 3:
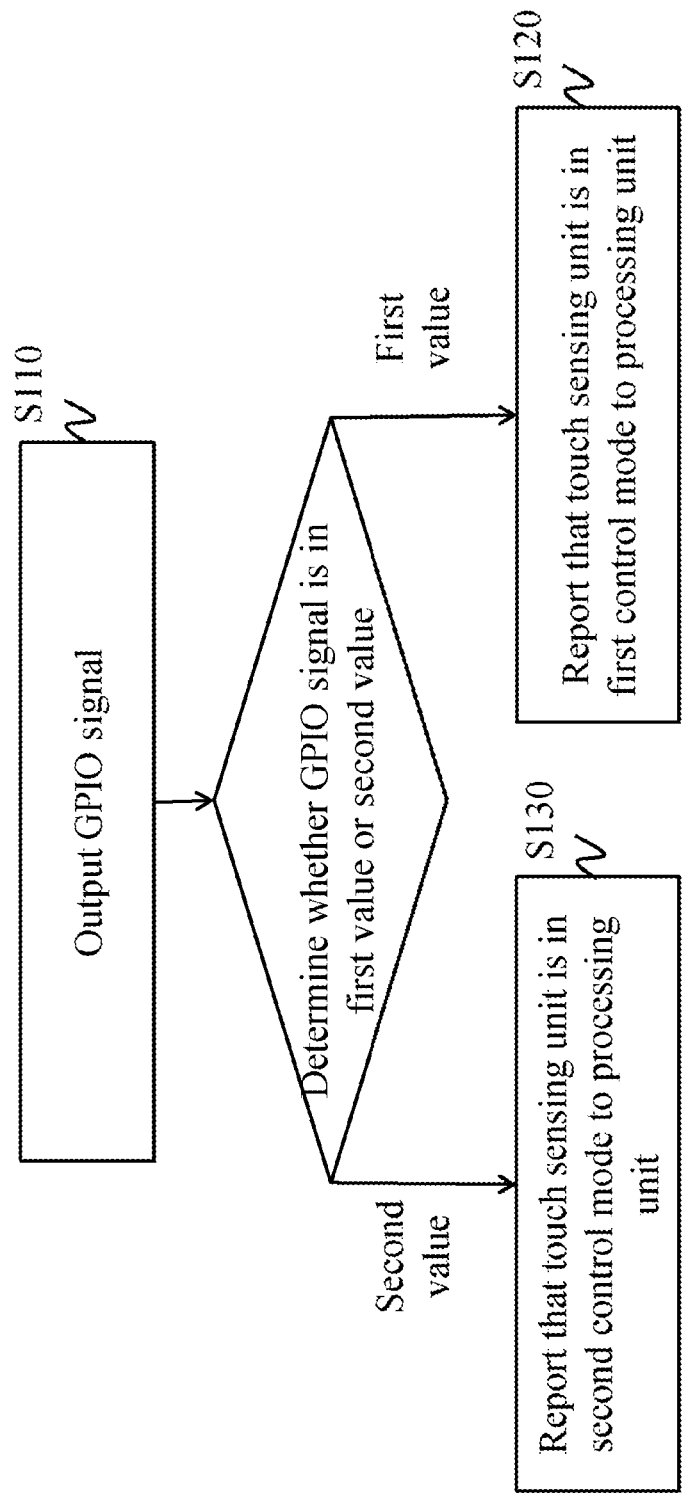
FIG. 3 is a flowchart of a control method for a touch device according to an embodiment of the present invention.

FIG. 3 shows a flowchart of a control method for a touch device according to an embodiment of the present invention. Referring to FIG. 3, in some embodiments, a control method for a touch device is further provided by the present invention. The control method includes the following steps. The embedded controller 23 outputs a GPIO signal (step S110). The digital controller 22 determines whether the GPIO signal is in a first value or a second value. When the GPIO signal is in the first value, the digital controller 22 reports that the touch sensing unit 21 is in a first control mode to the processing unit 24 (step S120). When the GPIO signal is in the second value, the digital controller 22 reports that the touch sensing unit 21 is in a second control mode to the processing unit 24 (step S130).

Figure 4:
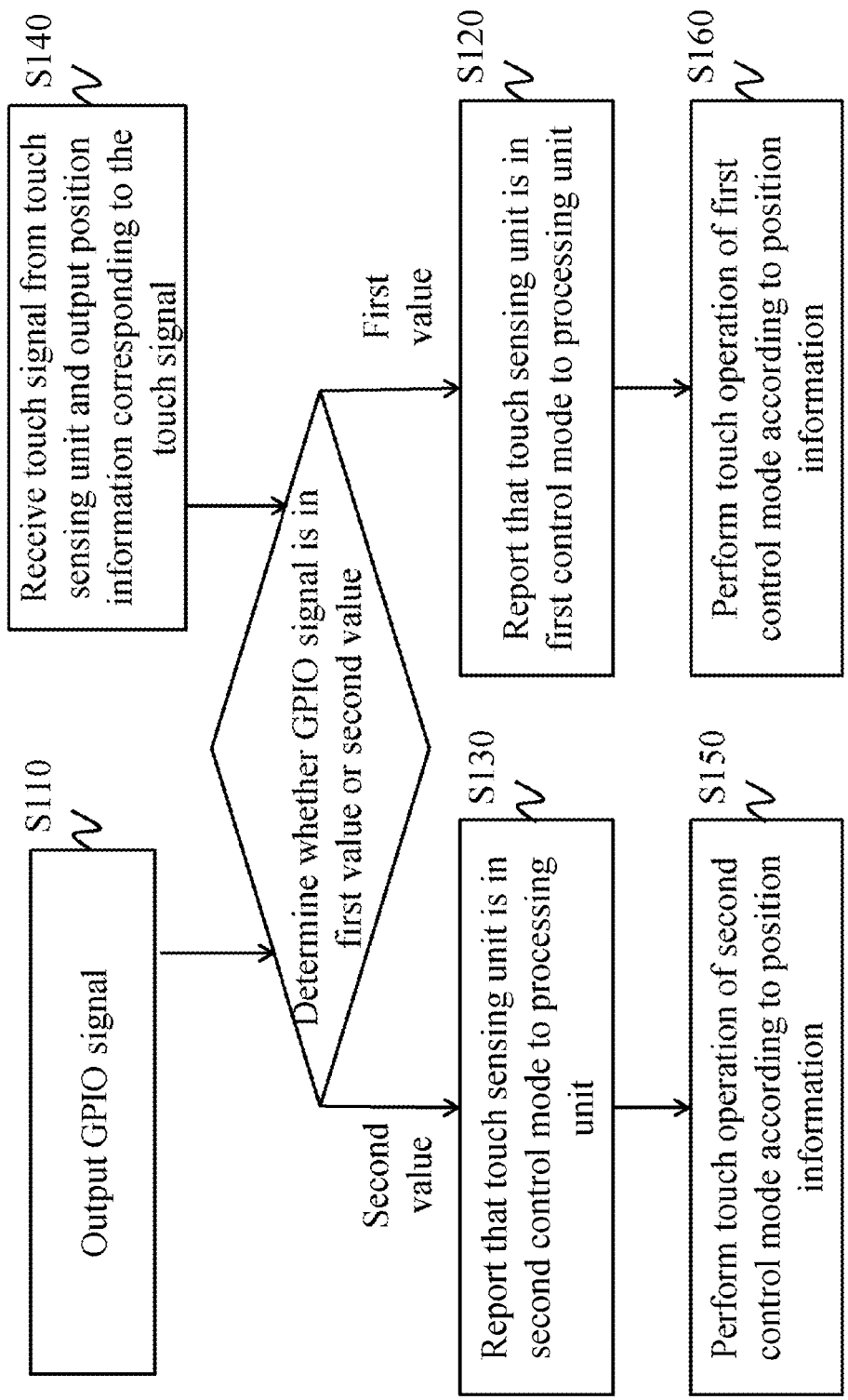
FIG. 4 is a flowchart of a control method for a touch device according to an embodiment of the present invention.

FIG. 4 shows a flowchart of a control method for a touch device according to an embodiment of the present invention. Referring to FIG. 4, in some embodiments, the digital controller 22 receives a touch signal from the touch sensing unit 21, and outputs position information corresponding to the touch signal (step S140). At this point, the touch signal represents a touch event from the touch stylus 10. Next, the digital controller 22 determines whether the GPIO signal is in a first value or a second value. When the GPIO signal is in the first value, the digital controller 22 reports that the touch sensing unit 21 is in the first control mode to the processing unit 24 (step S120), and performs a touch operation of the first control mode according to the position information (step S150). When the GPIO signal is in the second value, the digital controller 22 reports that the touch sensing unit 21 is in the second control mode to the processing unit 24 (step S130), and performs a touch operation of the second control mode according to the position information (step S160).

Figure 5:
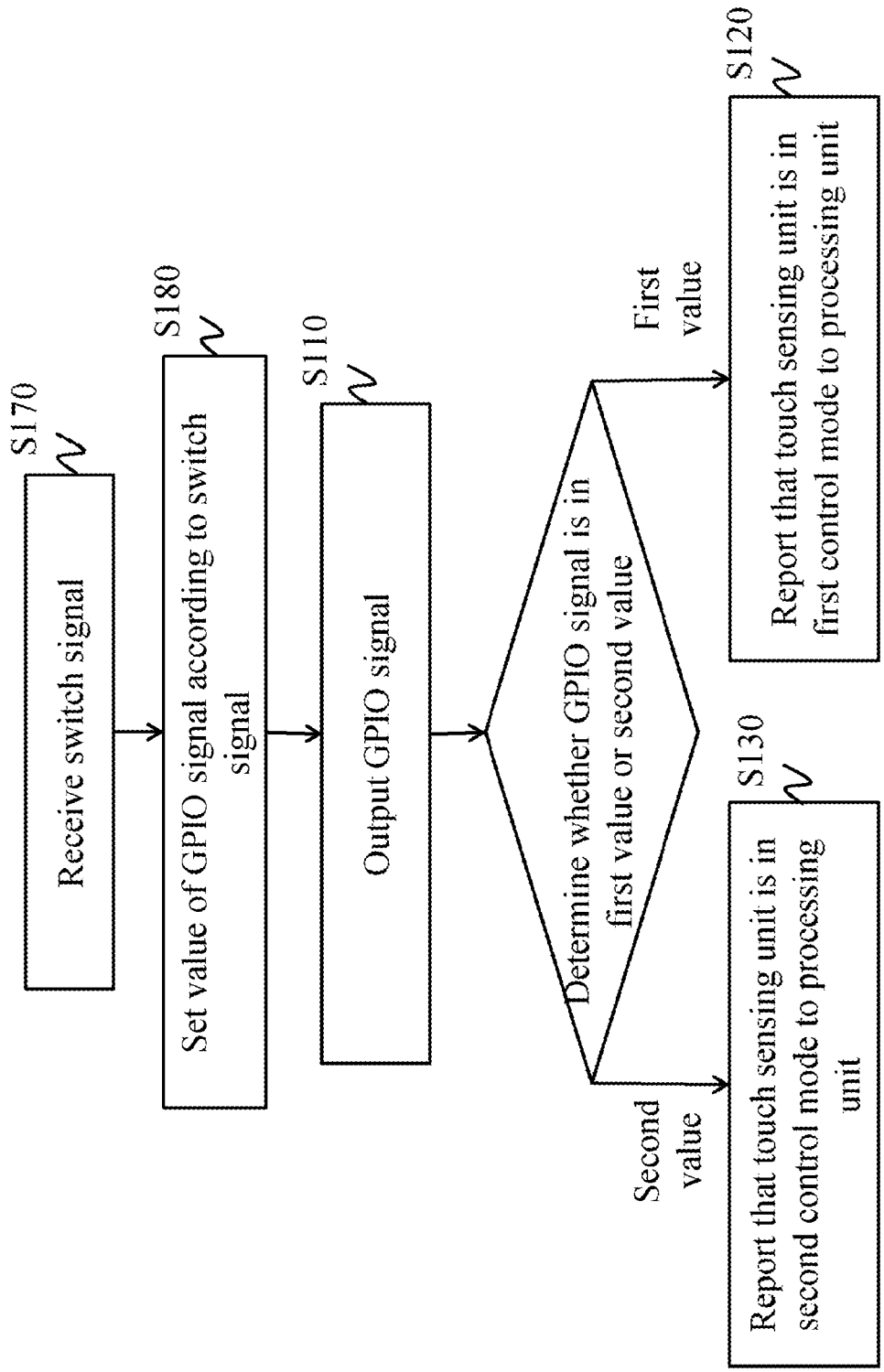
FIG. 5 is a flowchart of a control method for a touch device according to an embodiment of the present invention.

FIG. 5 shows a flowchart of a control method for a touch device according to an embodiment of the present invention. Referring to FIG. 5, in some embodiments, the embedded controller 23 receives a switch signal (step S170), and sets the value of the GPIO signal according to the switch signal (step S180), followed by performing step S110.

Figure 6:
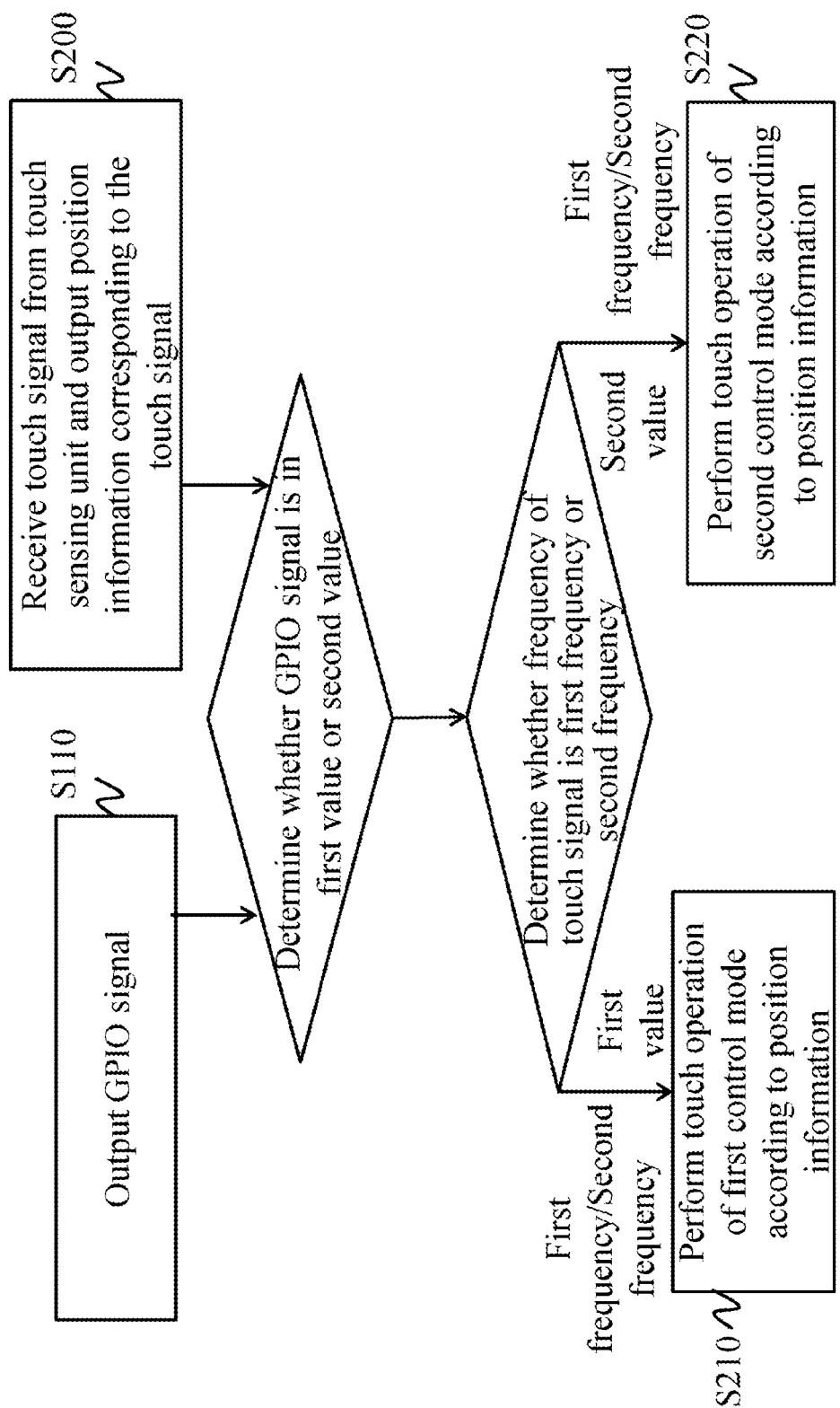
FIG. 6 is a flowchart of a control method for a touch device according to an embodiment of the present invention.

FIG. 6 shows a flowchart of a control method for a touch device according to an embodiment of the present invention. Referring to FIG. 6, in some embodiments, a touch signal from the touch sensing unit 21 is received, and position information corresponding to the touch signal is outputted (step S200). At this point, the touch signal represents a touch event from the touch stylus 10, and a frequency of the touch signal is one of a first frequency and a second frequency. Next, the digital controller 22 determines whether the GPIO signal is in a first value or a second value, and determines whether the frequency of the touch signal is the first frequency or the second frequency. When the frequency of the touch signal is the first frequency, the processing unit 24 performs a touch operation of the first control mode according to the position information (step S210). That is to say, whether the GPIO signal is in the first value or the second value, step S210 is performed given that the frequency of the touch signal is the first frequency.

Again referring to FIG. 6, when the frequency of the touch signal is the second frequency, the processing unit 24 performs a touch operation of the second control mode according to the position information (step S220). That is to say, whether the GPIO signal is in the first value or the second value, step S220 is performed given that the frequency of the touch signal is the second frequency. Further, the touch operation of the second control mode can correspond to a right-button function or an erase function respectively according to whether the GPIO signal is in the first value or the second value.

In some embodiment, the first control operation is a left-button function, and the second control mode is an erase function. In some embodiments, the first control mode is a left-button function, and the second control mode is a right-button function.

It should be noted that, although the steps are described in the above sequences, the present invention is not limited to an order of these sequences. A person skilled in the art can simultaneously perform some of the steps or exchange the sequences for performing some of the steps under reasonable conditions.

While the invention has been described by way of example and in terms of the embodiments, it is to be understood that the invention is not limited thereto. Modifications and similar arrangements and procedures made by a person skilled in the art without departing from the spirit of the present invention are covered within the scope of the present invention. Therefore, the scope of the appended claims should be accorded with the broadest interpretation so as to encompass all such modifications and similar arrangements and procedures.

What is claimed is:

1. A touch device, comprising:
 a touch sensing unit, sensing a touch event from a touch stylus and generating a touch signal of a frequency, the frequency is one of a first frequency and a second frequency, the touch sensing unit having a first control mode and a second control mode;
 a processing unit;
 an embedded processor, coupled to the processing unit; and
 a digital controller, coupled to the touch sensing unit, the embedded controller and the processing unit, the digital controller receiving a general-purpose input/output (GPIO) signal from the embedded controller; wherein, when the GPIO signal is in a first value, the digital controller reports the first control mode to the processing unit, and when the GPIO signal is in a second value, the digital controller reports the second control mode to the processing unit;
 wherein the touch stylus has an actuation unit controlling the frequency to switch between the first frequency and the second frequency, wherein the switching between the first and second frequencies is independent of the switching between the first control mode and the second control mode.

2. The touch device according to claim 1, wherein the digital controller further receives a touch signal from the touch sensing unit and outputs position information corresponding to the touch signal to the processing unit; when the GPIO signal is in the first value, the processing unit performs a touch operation of the first control mode according to the position information; when the GPIO signal is in the second value, the processing unit performs a touch operation of the second control mode according to the position information.

3. The touch device according to claim 1, wherein the embedded controller receives a switch signal from the processing unit, and generates the GPIO signal according to the switch signal.

4. The touch device according to claim 1, wherein when the touch sensing unit senses the touch event, the touch sensing unit generates a touch signal representing the touch event, the digital controller further outputs position information corresponding to the touch signal to the processing unit;
 when the frequency of the touch signal is the first frequency, the processing unit performs a touch operation of the first control mode according to the position information; when the frequency of the touch signal is the second frequency and the GPIO signal is in the first value, the processing unit performs a right-button function of the second control mode according to the position information; when the frequency of the touch signal is the second frequency and the GPIO signal is in the second value, the processing unit performs an erase function of the second control mode according to the position information.

5. A control method for a touch device, comprising:
 outputting a general-purpose input/output (GPIO) signal;
 receiving a touch signal from the touch sensing unit, a frequency of the touch signal is one of a first frequency and a second frequency, the frequency is controlled independently from the general-purpose input/output signal;
 when the GPIO signal is in a first value, reporting that a touch sensing unit is in a first control mode to a processing unit; and
 when the GPIO signal is in a second value, reporting that the touch sensing unit is in a second control mode to the processing unit.

6. The control method for a touch device according to claim 5, further comprising:

outputting position information corresponding to the touch signal, wherein the touch signal represents a touch event from a touch stylus;

when the GPIO signal is in the first value, performing a touch operation of the first control mode according to the position information; and when the GPIO signal is in the second value, performing a touch operation of the second control mode according to the position information.

7. The control method for a touch device according to claim 5, further comprising:

receiving a switch signal; and setting a value of the GPIO signal according to the switch signal.

8. The control method for a touch device according to claim 5, further comprising:

outputting position information corresponding to the touch signal, wherein the touch signal represents a touch event from a touch stylus and a frequency of the touch signal is one of a first frequency and a second frequency;

when the frequency of the touch signal is the first frequency, performing a touch operation of the first control mode according to the position information; and when the frequency of the touch signal is the second frequency and the GPIO signal is in the first value, the processing unit performing a right-button function of the second control mode according to the position information; and when the frequency of the touch signal is the second frequency and the GPIO signal is in the second value, the processing unit performing an erase function of the second control mode according to the position information.

* * * * *